April 29, 1952    L. J. WOLF    2,594,701
EXPANSION VALVE FOR USE IN REFRIGERATING
AND LIKE APPARATUS
Filed March 21, 1949    2 SHEETS—SHEET 1

Inventor
Louis Joel Wolf,
By Flocks and Simon
Attorneys

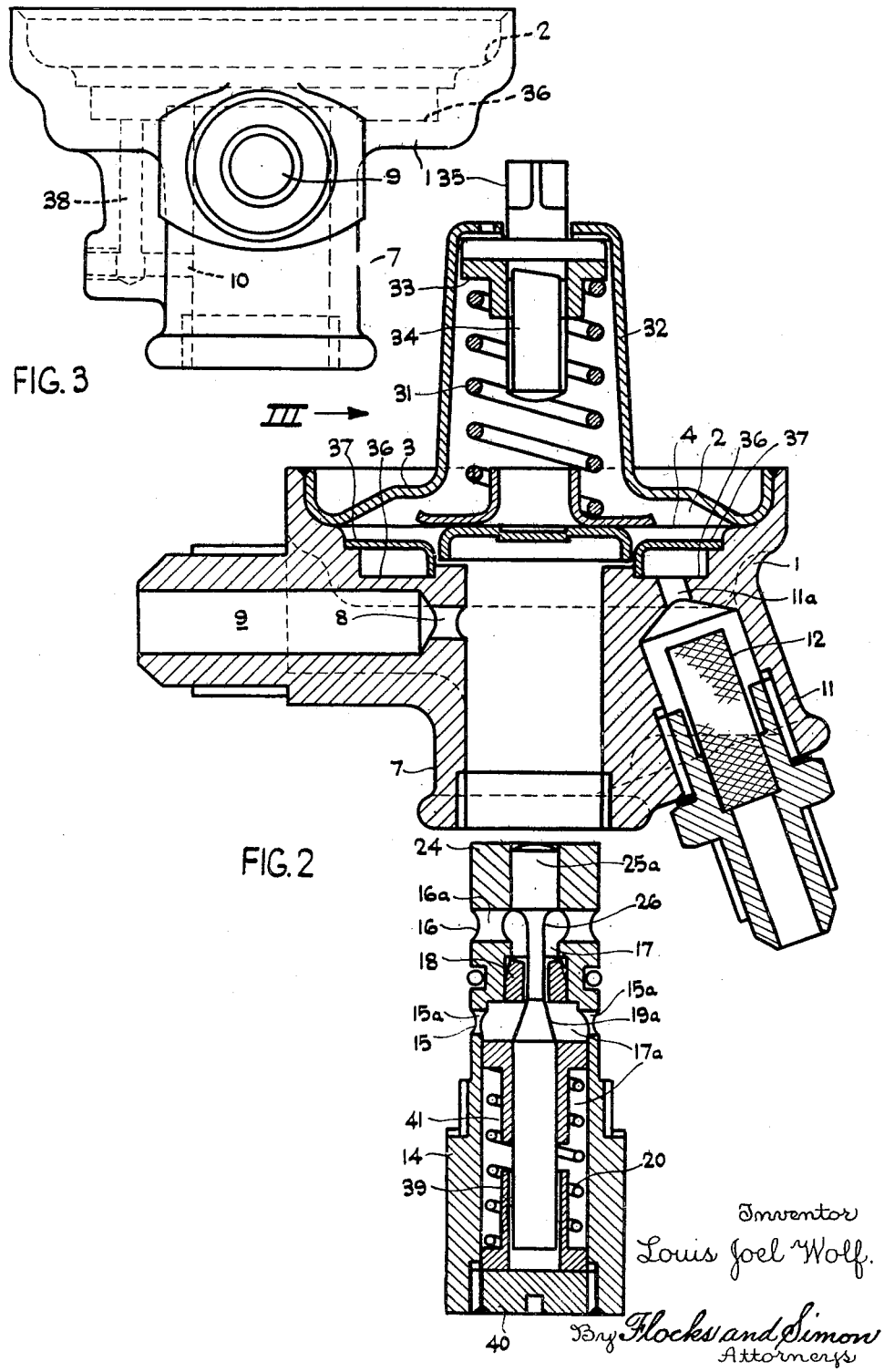

Patented Apr. 29, 1952

2,594,701

UNITED STATES PATENT OFFICE 2,594,701

EXPANSION VALVE FOR USE IN REFRIGERATING AND LIKE APPARATUS

Louis Joel Wolf, Westminster, England, assignor to Refrigerator Components Limited, London, England, a company of Great Britain Application March 21, 1949, Serial No. 82,566
In Great Britain March 10, 1948

6 Claims. (Cl. 62—127)

This invention concerns expansion valves for refrigerating air conditioning, and like apparatus, such valves being located at the inlet end of the cooling coil or evaporator to control the rate of flow of refrigerant therethrough. The invention is concerned with expansion valves of the balanced type in which the pressure of a spring and the evaporator pressure tending to close the valve are balanced either by atmospheric pressure acting on a diaphragm and by a second spring which can be set manually according to the desired temperature conditions in the cooling coil, or by fluid pressure on the diaphragm, the said fluid pressure being automatically varied according to the temperature of the refrigerant at the outlet from the cooling coil. The valve itself is normally of the needle, ball or disc type.

When servicing or replacing parts in such valves as hitherto constructed, it has normally been necessary to detach the whole valve body from the refrigerant circuit or to remove the diaphragm or adjustable spring assembly. Where the valve has been thermostatically controlled it has frequently been necessary to break the thermostat connection when carrying out servicing operations. This has involved disturbance of pressure tight seals around the diaphragm or at the refrigerant circuit connections, as well as loss of time during which the refrigerator has been out of service.

The present invention aims at providing a construction of expansion valve which will overcome these disadvantages, and which will also facilitate correct assembly of the moving valve parts before their insertion into the refrigerant circuit.

According to the present invention, a refrigerator expansion valve of the balanced type has a body comprising a diaphragm chamber, an open-ended skirt or socket part extending coaxially from the diaphragm chamber and communicating therewith at one end, and inlet and outlet branches opening through the body into said skirt or socket part, and a detachable valve unit comprising a plug or sleeve adapted to be removably inserted in fluid-tight manner into the skirt or socket part through the end thereof remote from the diaphragm chamber and a valve assembly wholly accommodated in the said plug or carrier.

Preferably the plug or sleeve of the detachable valve unit terminates at its inner end in an anvil or abutment surface adapted to co-operate with the diaphragm so as to determine the limit position of its travel in the valve opening direction. The skirt or socket part of the valve body and the plug or sleeve of the detachable valve unit may be of cylindrical form.

In order that the invention may be more clearly understood, two constructions of expansion valve, the one designed for thermostatic control and the other for manual pre-setting, will now be described by way of example only, with reference to the accompanying drawings in which:

Fig. 2 is a sectional elevation of a manually preset valve the plug or sleeve containing the valve assembly being shown removed from the skirt or socket part of the valve body, and Fig. 3 is an elevation on the arrow III of Fig. 2.

Figure 1:
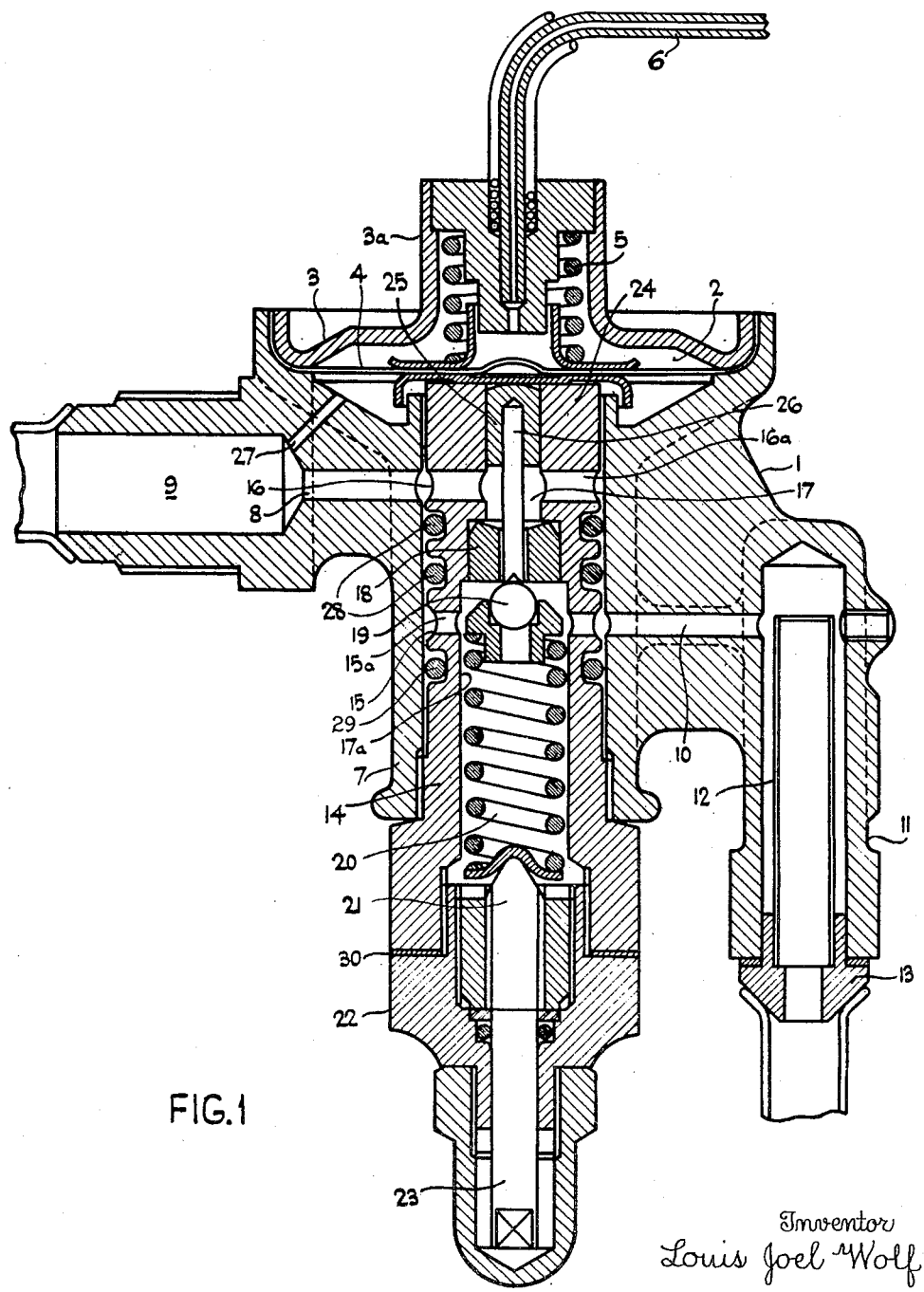
Fig. 1 is a sectional elevation of a thermostatically controlled valve.

Referring first to the thermostatically controlled form of valve shown in Fig. 1, the valve is intended to be mounted adjacent the evaporator and comprises a cast or forged body part 1 having a diaphragm chamber 2 in its upper end which is closed by a cover plate 3 adapted to clamp the diaphragm 4 in place in the chamber 2. Within the cover 3 is mounted a light loading spring 5 acting on the top of the diaphragm 4, whilst into the neck 3a of the cover 3 is connected in fluid-tight manner a narrow-bore tube 6 having a bulb (not shown) attached, in thermal contact, to the outlet pipe (also not shown) from the evaporator. This bulb may be filled with any convenient liquid or gas to exert a pressure on the upper side of the diaphragm 3 in accordance with the temperature of the vapour leaving the evaporator.

Below the diaphragm 4 the bore of a cylindrical skirt or socket 7 opens into the diaphragm chamber 2, this skirt part 7 being formed coaxially with the said chamber 2. At the upper end of the skirt 7 adjacent the diaphragm chamber 2 a port 8 is formed through the wall of the skirt which communicates with an outlet 9 for connection to the evaporator element. On the opposite side and lower down the wall of the skirt 7 is formed another port 10, which communicates with an inlet branch 11 provided with a filter 12 and a nipple 13 for connection to the refrigerant liquid supply line (not shown). The lower end of the skirt 7 is open-mouthed for the insertion thereinto of a valve unit.

This unit comprises a cylindrical plug or sleeve 14 which is a close fit within the skirt and extends to the diaphragm chamber 2 at its upper end. This plug or sleeve 14 has two annular grooves 15, 16 formed therein to register with the ports 10, 8 respectively, and these annular grooves 15, 16 communicate by radial ducts 15a, 16a with a central bore 17 in the carrier 14. Between the two grooves 15, 16, this central bore 17 carries the seating 18 of a ball valve 19, the ball 19 being located below the seating 18 in an enlarged portion 17a of the bore 17 in which is also accommodated a compression loading spring 20 which bears against the underside of the valve member 19. The lower end of the loading spring 20 bears against an adjustable abutment 21 which is screwed into a nipple 22 detachably inserted into the open mouth of the enlarged bore 17a through the sleeve 14 and provided with an manual adjustment stem 23. The whole assembly 14 ... 23 thus constitutes a detachable valve unit.

Above the valve seating 18, the sleeve 14 terminates in an anvil 24 which is bored coaxially with the valve seating 18 to receive as a sliding fit a thimble 25 engaging an operating pin 26 for the ball valve 19. In order to enable the reduced pressure in the suction line connected to the outlet 9 and leading to the compressor (not shown) to be applied to the inside of the diaphragm 4, a bleed passage 27 communicates between the under-side of the diaphragm 4 and the outlet branch 9. The upper end surface of the anvil 24 is accurately machined to constitute an abutment for the diaphragm 4 when the latter is at its lower limit of travel. The valve pin 26 is of such a length as to press the thimble 25 upwards through this anvil 24 sufficiently to engage the under-side of the diaphragm 4 when at its upper limit of travel. In this way the ball valve 19 can be opened or closed in accordance with the difference in the pressures exerted on the diaphragm 4 by the spring 5 and the thermostatic fluid in the tube 6 on the one side and by the suction pressure in the outlet 9 to the cooling coil and the thrust of the loading spring 20 acting on the ball valve 19 on the other side. The valve 19 thus operates in the normal manner of thermostatically controlled expansion valves of the balanced type.

In order to seal the groove 16 communicating with the low-pressure outlet 9 from the groove 15 communicating with the high-pressure inlet branch 11, the sleeve 14 is provided with two intermediate annular grooves in its outer wall into each of which is inserted a radially deformable resilient packing ring 28 of a known kind which has a free diameter slightly greater than the internal diameter of the skirt part 7 of the valve body 1. These rings 28 are thus compressed between the bases of their respective grooves and the internal wall of the skirt 7 when the sleeve 14 is inserted thereinto, and constitute the necessary pressure seal. A similar ring 29 is located below the annular groove 15 to seal the inlet branch 11 from atmospheric pressure. A further seal 30 is provided around the lower end of the enlarged bore 17a through the plug or sleeve 14 to ensure that there is no leakage of refrigerant from the ball valve 19 therethrough.

In the construction of valve illustrated in Figs. 2 and 3 the thermostat connection 6 to the diaphragm chamber 2 is replaced by a manually adjustable compression spring 31. The spring 31 is housed in a tubular extension 32 of the diaphragm cover 3. It bears at its upper end against an abutment 33 which is threaded on a stem 34, having its free upper end 35 squared for engagement with a detachable key or hand wheel. The construction of the remaining parts of the valve is similar in principle to those of the valve shown in Fig. 1, but rearranged to reduce the overall dimensions of the valve body to a minimum. The inlet branch 11 of the valve body 1 which contains filter 12 is located just below the diaphragm chamber 2. The bottom of this chamber is recessed in the form of a shallow annular channel 36 the top of which is closed by an annular partition 37 which seals the channel 36 from the space below the diaphragm 4 to form a separate compartment within the chamber 2.

The inlet branch 11 communicates with this compartment 36 through a short duct 11a whilst a further duct 38 (Fig. 3) communicates with the radial inlet 10 which opens through the internal wall of the skirt 7 of the valve body. This inlet port 10 registers with an annular groove 15 formed around the plug or sleeve 14 and which communicates by way of radial ports 15a with the central bore 17a through the plug or sleeve 14. Above the level of the ports 15a the bore 17a is reduced in diameter to accommodate the valve seat 18 which in the form illustrated in Figures 2 and 3 is arranged to co-operate with a coned needle valve 19a. This conical valve is in contact with the pin 26 which terminates at its upper end in a head 25a which bears against the under side of the diaphragm 4. Below the conical valve portion 19a, the valve member is extended downwards to be received at its lower end within a flanged guide bush 39 which is located within the bore 17a in the sleeve 14 by means of a threaded plug 40 which is sealed into the open end thereof. Immediately below the conical valve formation 19a the second flanged guide bush 41 is rigidly secured to the valve member and is a sliding fit within the bore 17a, the two flanged guide bushes 39, 41 having skirt portions of a diameter to pass freely within the convolutions of a helical compression spring 20 which bears at its lower end on the flanged bush 39 and at its upper end on the flange of the bush 41.

The operation of this valve is substantially similar to that described in connection with the valve shown in Fig. 1 except that the opening and closing of the needle valve 19a is independent of the fluctuations of temperature in the expansion coil of the refrigerator.

By the adoption of the construction shown in Figs. 2 and 3 however, it is possible to substantially reduce the overall dimensions of the valve body 1 without sacrificing any of the accessibility of the valve assembly in the sleeve 14. As before the whole valve assembly is detachable from the valve body by unscrewing the sleeve 14 from the skirt part of the body.

Either of the constructions described above thus provides a completely detachable valve unit 14 which can be withdrawn from the valve body 1 for cleaning or replacement of the parts without disturbing any of the connections between the valve 1 and the refrigerant circuit at 9 and 11. Moreover, the seal around the diaphragm 4 need not be disturbed, and the thermostat circuit 6, in the construction shown in Fig. 1 remains closed at all times.

The constructions have the further advantage that, since the upper surface of the anvil 24 constitutes the lower abutment for the diaphragm 4, the length of ball valve pin 26 or push rods which is required to give the maximum lift of the valve 19 in any given assembly can be readily determined. Thus, in the assembly of an expansion valve constructed in accordance with the invention, the valve 19 can be accurately set before the parts are finally assembled into the valve body 1.

If preferred, the bore through the anvil 24 may be of a diameter to accommodate the pin 26, the upper end of the latter bearing directly on the diaphragm 4. In order to set each valve, a thimble 25 having the desired thickness at its closed end may be selected before the carrier 14 is inserted into the valve body 1. As will be understood, a variety of other methods of adjustment of the parts to suit each individual valve may be adopted as desired.

All parts of the valve, except the diaphragm 4, are more readily accessible for replacement or for cleaning without the necessity of removing the expansion valve body 1 from the refrigerant circuit.

What I claim is:

1. An automatic valve of the balanced type having a body comprising a diaphragm chamber, an open-ended socket part extending coaxially from the diaphragm chamber and communicating therewith at one end, a diaphragm located within said chamber, and inlet and outlet branches opening through the body into the said socket part, a detachable valve unit comprising a plug part adapted to be removably inserted in a fluid-tight manner into the socket part of the body through the open end thereof remote from the diaphragm chamber, an anvil formation on the inner end of the plug part to limit the deflection of the diaphragm in the valve opening direction, and a valve assembly wholly accommodated in the said plug part and having a valve operating member projecting through the anvil for engagement with the diaphragm.

2. An automatic valve as claimed in claim 1 wherein the detachable valve unit has a bore therethrough, a valve seat located within the bore intermediate its ends, a port opening through the wall of the plug part below the valve seat to communicate with the inlet branch in the body, a second port through the wall of the plug part above the valve seat to communicate with the outlet port, and valve means to cooperate with the valve seat on the inlet side thereof, and the valve operating member extending through the anvil formation to engage the diaphragm is freely detachable.

3. An automatic valve of the balanced type having a body comprising a diaphragm chamber, a diaphragm in the said chamber, an open-ended socket part extending coaxially from the diaphragm chamber and communicating therewith at one end, an outlet branch opening through the body into said socket part and an inlet branch opening into a cavity within the diaphragm chamber, a fluid-tight partition between the said cavity and the diaphragm chamber, and a duct communicating between said cavity and the socket part, and a detachable valve unit comprising a plug part adapted to be removably inserted in a fluid-tight manner into the socket part of the body through the open end thereof remote from the diaphragm chamber, an anvil formation on the inner end of the plug part to limit the deflection of the diaphragm in the valve opening direction, a valve assembly wholly accommodated in the said plug part and having a valve operating member projecting through the anvil for engagement with the diaphragm.

4. An automatic valve of the balanced type having separable body and valve assemblies, external circuit connections on the body part, ports in the body communicating with at least some of the said external circuit connections, corresponding ports in the valve assembly to register with the ports in the body, a diaphragm in the body for controlling the valve opening, an anvil at the inner end of the valve assembly constituting a fixed abutment for the diaphragm when the body and valve assemblies are operatively connected together to limit its travel in the valve opening direction, and a valve operating member freely passing through the anvil formation to engage the diaphragm.

5. An automatic valve as claimed in claim 1 wherein the valve operating member comprises a rod of a length such as to terminate short of the operative surface of the anvil when the valve is in the closed condition, and a thimble slidably accommodated in the bore through the anvil to fit over the end of the said rod, the crown of the said thimble projecting beyond the operative surface of the anvil by an amount dependent on the desired degree of opening of the valve when the diaphragm rests on the said surface of the anvil.

6. An automatic valve of the balanced type having a body comprising a diaphragm chamber, an open-ended socket part extending coaxially from the diaphragm chamber and communicating therewith at one end, a diaphragm located within said chamber, and inlet and outlet branches opening through the body into said socket part, a detachable valve unit comprising a rigid sleeve terminating at its inner end in an anvil for limiting the travel of the diaphragm in the valve opening direction, a valve seat located within the sleeve intermediate its ends, a port opening through the wall of the sleeve part below the valve seat to communicate with the inlet branch in the body, a second port through the wall of the sleeve part above the valve seat to communicate with the outlet port, valve means to cooperate with the valve seat on the inlet side thereof, and a freely detachable valve operating member extending through the anvil formation to engage the diaphragm, a loading spring for said valve and an outer abutment therefor, said sleeve being of a length to extend between the diaphragm chamber and the outer abutment for the valve loading spring when inserted into the body.

LOUIS JOEL WOLF.

REFERENCES CITED

The following references are of record in the file of this patent:

UNITED STATES PATENTS

| Number | Name | Date |
|---|---|---|
| 2,197,454 | Smith | Apr. 16, 1940 |
| 2,484,156 | Dube | Oct. 11, 1949 |